United States Patent [19]

Rustioni et al.

[11] 4,316,746
[45] Feb. 23, 1982

[54] MOLYBDENUM OR TUNGSTEN CONTAINING BISMUTH VANADATE YELLOW PIGMENTS AND PROCESS FOR PREPARING SAME

[75] Inventors: Massimo Rustioni, Calusco D'Adda; Luigi Balducci, Mortara, both of Italy

[73] Assignee: Montedison S.P.A., Milan, Italy

[21] Appl. No.: 237,477

[22] Filed: Feb. 23, 1981

[30] Foreign Application Priority Data

Feb. 25, 1980 [IT] Italy ............................... 20146 A/80

[51] Int. Cl.$^3$ ................................................. C09C 1/00
[52] U.S. Cl. ................................. 106/288 B; 423/593; 106/306
[58] Field of Search ................ 106/288 B, 306; 423/593

[56] References Cited

U.S. PATENT DOCUMENTS

| | | | |
|---|---|---|---|
| 4,063,956 | 12/1977 | Higgins | 106/288 B |
| 4,115,142 | 9/1978 | Hess | 106/288 B |
| 4,230,500 | 10/1980 | Balducci et al. | 106/288 B |
| 4,272,296 | 6/1981 | Balducci et al. | 106/288 B |

*Primary Examiner*—Helen M. McCarthy
*Attorney, Agent, or Firm*—Stevens, Davis, Miller & Mosher

[57] ABSTRACT

This invention relates to new inorganic yellow pigments consisting or consisting essentially of $Bi_{1-(x/3)} M_x V_{1-x} O_4$ in which M is Mo or W.

The value of x varies from 0.075 to 0.317 in the case of Mo and from 0.059 to 0.265 in the case of W. These pigments are composed of only the tetragonal crystalline phase of the scheelite type when M is Mo; when M is W, also the orthorhombic crystalline phase $\gamma Bi_2 WO_6$ is present.

These pigments may also contain a crystalline phase consisting of orthorhombic $BaSO_4$; in such case the amount of $BaSO_4$ may reach 80% by weight of the pigment.

9 Claims, No Drawings

MOLYBDENUM OR TUNGSTEN CONTAINING BISMUTH VANADATE YELLOW PIGMENTS AND PROCESS FOR PREPARING SAME

This invention relates to new yellow inorganic pigments and to a process for preparing same.

The most used yellow pigments are the chromium yellows, the cadmium yellows, and the cadmium yellows extended with $BaSO_4$. Since these conventional pigments contain hexavalent chromium and lead or cadmium, they are suspected of being toxic.

There are alternative pigments of the same color, based on nickel titanates $TiO_2$—$NiO$—$Sb_2O_3$, which however do not possess properties comparable to those of the abovesaid pigments as regards color saturation and tinting strength.

It has also been suggested to use, as an alternative pigment, bismuth vanadate $BiVO_4$ having a monoclinic crystalline structure; in fact such product possesses optical and pigmental properties similar to those of chromium yellow primrose.

It is an object of the present invention to provide new yellow pigments free from lead, chromium and cadmium and exhibiting optical and pigmental properties similar to those of the conventional yellow pigments.

Another object is to provide yellow pigments which may contain a cheap diluent which reduces their price.

A further object is to provide a process for preparing the abovesaid pigments.

These and still other objects are achieved by the new inorganic yellow pigments according to the present invention, which consist or consist essentially of $Bi_{1-(x/3)}M_xV_{1-x}O_4$ wherein M is Mo or W and wherein x varies from 0.075 to 0.317 in the case of Mo and from 0.059 to 0.265 in the case of W. These pigments consist of only the tetragonal crystalline phase of the scheelite type when M is Mo; when M is W they contain, besides the above-said tetragonal crystalline phase, also the orthorhombic crystalline phase $\gamma$ $Bi_2WO_6$.

It has in fact been found that the aforesaid substances are endowed with pigmentary properties and are comparable, as regards their colorimetric characteristics, tinting strength and hiding power, to the conventional yellow pigments and to monoclinic $BiVO_4$.

These pigments consist of solid solutions among the three components $Bi_2O_3$, $V_2O_5$ and $MoO_3$ or $WO_3$. In the case of Mo, when x is equal to 0.075 the weight percent composition of the various oxides is as follows: $Bi_2O_3 = 70.5\%$; $MoO_3 = 3.4\%$; $V_2O_5 = 26.1\%$; and when x is equal to 0.317, the composition is as follows: $Bi_2O_3 = 65.9\%$; $MoO_3 = 14.4\%$; $V_2O_5 = 19.7\%$.

In the case of W, when x is equal to 0.059, the weight percent composition of the various oxides is as follows: $Bi_2O_3 = 69.7\%$; $WO_3 = 4.2\%$; $V_2O_5 = 26.1\%$; and when x is equal to 0.265, the composition is as follows: $Bi_2O_3 = 62.4\%$; $WO_3 = 18.0\%$; $V_2O_5 = 19.6\%$.

When x is below the minimum values indicated, no good crystallization of the tetragonal crystalline phase is obtained.

When x is higher than the maximum values indicated, a decrease in the color saturation of the products is generally observed.

Preferably x is between about 0.075 and about 0.230 in the case of Mo and between about 0.059 and about 0.180 in the case of W.

In the products containing W, the amount of crystalline phase $\gamma$ $Bi_2WO_6$ increases as the value of x increases. When x has the minimum value indicated, $\gamma$ $Bi_2WO_6$ is present only in traces.

The dominant wave length $\lambda_D$ of the W-containing products may be slightly higher than that of the Mo-containing products. In fact, the former have a $\lambda_D$ generally ranging from about 573 to about 578 nm, while the $\lambda_D$ of the latter is generally between about 573 and about 576 nm.

The pigments according to this invention may also contain a crystalline phase consisting or consisting essentially of orthorhombic $BaSO_4$ obtained by coprecipitation and simultaneous calcination with the substances used for preparing $Bi_{1-(x/3)}M_xV_{1-x}O_4$. In such case the amount of $BaSO_4$ in weight percent is higher than 0% and lower than or equal to 80%. Such products are more advantageous from an economic viewpoint, in consideration of the low cost of the starting products employed for preparing $BaSO_4$.

The cost of the product decreases as the amount of $BaSO_4$ increases. If more than 80% of $BaSO_4$ is used, the tinting strength and the hiding power of the pigments decrease too much. It is preferable to use from 20 to 80% of $BaSO_4$, while among the products diluted with $BaSO_4$ the most preferred are those containing from 30 to 60% thereof; in fact they possess a color saturation, a tinting strength and a hiding power comparable to those of the chromium yellow and cadmium yellow pigments.

The pigments of the present invention can be prepared according to the following process, which too is an object of this invention. When the pigment is free from $BaSO_4$, a solution of $Bi(NO_3)_3$ in nitric or acetic acid is prepared, the pH of the nitric solution being not greater than 0.5 while the pH of the acetic solution is between 0.1 and 1.5.

An alkaline solution of alkaline vanadate or of ammonium vanadate and of alkaline molybdate or tungstate or of ammonium molybdate or tungstate is prepared, the pH of the alkaline solution being between 8 and 14. Under stirring, the latter solution is added to the former, with consequent precipitation of a product resulting from the reaction between the cations $Bi^{+++}$ and the anions, the pH at the end of the precipitation being between 0.5 and 6.0. The precipitate is separated from the mother liquor and is washed to remove the soluble salts. The product is calcined in the presence of air at temperatures ranging from 400° to 700° C.; the calcination product is gradually cooled and then ground.

When a pigment containing $BaSO_4$ is to be prepared, the former solution contains furthermore $Ba(NO_3)_2$, while the latter contains also an alkaline or ammonium sulphate.

As alkaline or ammonium vanadate it is possible to use an orthovanadate $VO_4^{---}$, a metavanadate $VO_3^{-}$ or a pyrovanadate $V_2O_7^{----}$.

It is also possible to use $V_2O_5$ dissolved in an alkaline hydroxide or in ammonia. Instead of molybdate or of tungstate one may use $MoO_3$ or $WO_3$ dissolved in an alkaline hydroxide or in ammonia.

Sodium salt is generally used for the various anions (vanadate, molybdate, tungstate and sulphate).

As an acid solution it is preferably to use the acetic solution since it usually leads to the formation of pigments having a higher color saturation. If a nitric solution is used, its pH generally ranges from 0 to 0.5. The use of a pH higher than 0.5 in the case of a nitric solution, or higher than 1.5 in the case of an acetic solution, is to be avoided as it could cause the precipitation of a basic bismuth compound. The amounts of reagents contained in the acid solution and in the alkaline solution are usually such as to observe the stoichiometry of the reaction:

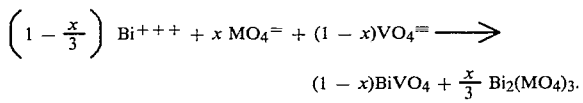

$$\left(1 - \frac{x}{3}\right) Bi^{+++} + x\, MO_4^= + (1-x)VO_4^\equiv \longrightarrow$$
$$(1-x)BiVO_4 + \frac{x}{3} Bi_2(MO_4)_3.$$

When a pigment containing $BaSO_4$ is to be obtained, the amount of the ions $Ba^{++}$ and $SO_4^{--}$ is calculated both on the basis of the stoichiometry of the reaction leading to the formation of $BaSO_4$, and on the basis of the desired final composition.

Further details on the preparation of pigments free from $BaSO_4$ are given hereinafter. Possible variations concerning the case of pigments containing $BaSO_4$ will be illustrated later on.

The concentration of $Bi(NO_3)_3$ in the acid solution may vary, for example, from 0.15 to 0.3 mole/liter.

Operating with a nitric solution, the nitric acid concentration is, for example, 1 N. Operating with an acetic solution, the molar ratio $Bi(NO_3)_3/CH_3CO_2H$ is generally in the range of from 0.02 to 0.1.

Generally, the total concentration of the oxyanions of vanadium and molybdenum or tungsten ranges from 0.15 to 0.40 mole/liter.

The temperature at which the pigment precipitates is generally between 15° and 100° C. Preferably one operates at temperatures of from 25° to 60° C. When operating at higher than 60° C., the calcined product tends to be greater and the tinting strength, the hiding power and the color saturation tend to decrease.

The precipitation time generally varies from 5 minutes to 1 hour. At the conclusion of the precipitation the slurry will continue to be stirred, for example for times of from 15 minutes to 1 hour.

The maturation temperature of the precipitate is generally between 15° and 100° C. and, preferably, between 25° and 60° C., for the reasons already explained. Maturation is preferably effected at the same temperature as precipitation.

When the precipitation has ended, the pH ranges from 0.5 to 6.0. When it is operated at a pH lower than 0.5, no complete precipitation of the pigment is attained, while at a pH higher than 6.0 the pigment is generally not endowed with good properties. At the conclusion of the precipitation the pH is preferably between 1.5 and 4.0; in this range of values it is generally possible to obtain the products having the best color saturation, tinting strength and hiding power. By increasing the pH in the range of from 0.5 to 6.0, products having a higher $\lambda_D$ are usually obtained.

The product, once separated from the mother liquor, is washed with water to remove the soluble salts and is then subjected to the heat treatment.

Such treatment can be carried out either on the product in the form of a paste, i.e., on the filtration cake, or on the previously dried product, for example dried at 100°–130° C. Calcination is effected in the presence of air at temperatures ranging from 400° to 700° C. Operating at temperatures below 400° C., a low color saturation is obtained; at temperatures above 700° C., besides a low color saturation, a low tinting strength and a low hiding power are obtained. One preferably operates at temperatures ranging from 500° to 600° C.; in such range these properties generally reach the best values.

The calcining operation generally takes from 30 minutes to 3 hours. Although it is possible to operate under static conditions, it is preferable to use a rotary furnace to secure a higher uniformity of temperature and a higher homogeneity of product. When calcination is conducted under static conditions, it is preferable to effect a double heat cycle interrupted by a grinding step: by operating under these conditions a more homogeneous product may be obtained.

To obtain good products it is necessary to cool the calcination product gradually; for example it can be brought to temperatures between 200° C. and room temperature in a time varying from 2 to 24 hours. Successively the products are discharged from the furnace and cooled down, if necessary, to room temperature, whereupon they are subjected to grinding, which is preferably carried out under wet conditions, for instance in a ball, microball or sand mill. If the product is wet ground, then it must be dried, for example at 100°–110° C., whereupon it is then subjected to a dry grinding, for example in an automatic mortar.

When a pigment containing $BaSO_4$ is to be prepared, the total concentration of the acid solution in $Bi(NO_3)_3$ and $Ba(NO_3)_2$ generally ranges from 0.15 to 0.30 mole/liter of solution, while the total concentration of the alkaline solution in vanadate, molybdate or tungstate, and sulphate generally ranges from 0.15 to 0.40 mole/liter of solution. The other procedures are otherwise identical with those followed for preparing the products free from $BaSO_4$.

The following examples are given in order still to better illustrate the inventive idea of the present invention.

EXAMPLE 1

A bismuth nitrate solution was prepared by dissolving 70.71 g of $Bi(NO_3)_3.5H_2O$ in 183 ml of glacial acetic acid and then by diluting with water to 750 ml; the resulting solution had a pH of 0.4.

Separately, 600 ml of a solution containing 15.07 g of $NaVO_3$, 10 g of NaOH and 8.10 g of $Na_2MoO_4.2H_2O$ were prepared; the pH of the resulting solution was 13.3.

Into a 2.5-liter beaker containing the bismuth nitrate solution heated at 60° C. and maintained under stirring, the vanadate-molybdate solution was added in 15 minutes.

On completion of the precipitation, the slurry was stirred for a further 30 minutes at 60° C.; at the end of the precipitation the pH, at such temperature, was 1.5; the precipitate was washed by decantation, it was filtered under vacuum and the cake was dried at 100°–110° C.

After drying, the product was ground in an automatic mortar of the type Pulverisette and then subjected to calcination for 1 hour in a muffle at 600° C.

The product, after cooling down to room temperature, was dry ground in the automatic mortar and calcined again at 600° C. for 1 hour.

After calcination the product was allowed to gradually cool down in about 20 hours to room temperature. It was then wet ground in a ball mill for about 20 minutes, filtered, dried at 100°–110° C. and again dry ground in the automatic mortar.

The product thus obtained had the following weight percent composition:

$Bi_2O_3=67.9\%$; $V_2O_5=22.5\%$; $MoO_3=9.6\%$ and corresponded to a product of formula:

$Bi_{1-(x/3)}Mo_xV_{1-x}O_4$ wherein x=0.213.

The x-ray diffractometric analysis of this product revealed only a tetragonal phase of the scheelite type.

The granulometry was of about 0.5 micron.

The colorimetric characteristics of the product were determined on a dry 50-micron thick paint film, prepared by dispersing in a Hoover kneading machine two parts of the pigment in one part of a vehicle having the following composition:

| | |
|---|---|
| Aroplaz 1279 produced by a the firm Alcrea (alkyl resin = 68% by weight; soybean oil = 32%) | 76.3% |
| FL 30 (boiled linseed oil) produced by the firm Ferrari & Figli | 19.0% |
| Drying mixture | 4.7% |
| The drying mixture had the following composition: | |
| Ca naphthenate | 1.77% |
| Zr naphthenate | 5.31% |
| Co naphthenate | 6.90% |
| white spirit | 86.02% |

The tinting strength was determined by kneading 1 g of the pigment with 3 g of titanium dioxide and 3 g of the vehicle. It was calculated as the percent ratio between color saturation of the dilute tone and that of the mass tone.

Colorimetric measurements were effected by means of a differential tristimulus colorimeter Ducolor, model 220 of Neotec Instruments Corp. Such apparatus provides the tristimulus values X, Y, Z and the reflectances $R_v$, $R_a$, $R_b$, respectively, on green, amber and blue filters in respect of a standard calibrated to magnesium oxide (standard S/N 22197 of Neotec Corporation with $R_v=92.0$, $R_a=92.0$, $R_b=88.6$).

From the tristimulus values X, Y, Z indicated by the apparatus the trichromatic coordinates (x, y) were obtained and, graphically, the values of the dominant wave length ($\lambda_D$) and of the color saturation (P%) were inferred.

In Table 1 the found values as well as the tinting strength values are compared with those of two commercial products: a chromium yellow "primrose" and a light cadmium yellow.

TABLE 1

| Product | $R_v$ | $R_a$ | $R_b$ | $\lambda_D$ | P % | Tinting strength (%) |
|---|---|---|---|---|---|---|
| Example 1 | 75.0 | 85.0 | 9.4 | 574.0 | 81.0 | 65.0 |
| Chromium yellow primrose | 77.2 | 87.6 | 10.2 | 574.0 | 80.0 | 60.1 |
| Light cadmium yellow | 76.7 | 85.7 | 10.7 | 574.0 | 79.0 | 70.6 |

As can be inferred from Table 1, the product of Example 1 exhibits optical and pigmental properties fully comparable to those of the two commercial products. The tinting strength of the product of the example has an intermediate value in respect of that of the commercial products.

From a visual comparison amongst paint films applied on Morest cards, the hiding power of the product of the example was found to be comparable to those of the commercial products.

EXAMPLE 2

The first solution consisted of 68.26 g of $Bi(NO_3)_3.5H_2O$ dissolved in 80 ml of glacial acetic acid (99%) and diluted to 800 ml with water; the pH of the solution was 0.1.

The precipitating solution contained 15.07 g of $NaVO_3$, 124 ml of a 2 N solution of NaOH, 8.51 g of $Na_2WO_4.2H_2O$ and water to make up 500 ml; the pH of the solution was 13.3.

The precipitation and calcination procedures were analogous to those described in Example 1.

The product thus obtained had the following composition expressed in weight percent: $Bi_2O_3=65.6\%$; $V_2O_5=22.4\%$; $WO_3=12\%$; and corresponded to a product of general formula:

$Bi_{1-(x/3)}W_xV_{1-x}O_4$ wherein x=0.173.

Such product, subjected to x-ray diffractometric analysis, revealed two phases: the first phase was analogous to that of the product of Example 1 (i.e., tetragonal of the scheelite type), while the other phase corresponded to that of the compound $\gamma$ $Bi_2WO_6$.

The granulometry was 0.5 micron.

The colorimetry characteristics of the product, determined in like manner as described in Example 1, were as follows:

| $R_v$ | $R_a$ | $R_b$ | $\lambda_D$ | P % |
|---|---|---|---|---|
| 72.3 | 82.4 | 9.6 | 574.7 | 80.0 |

Comparing these results with those of the commercial products of Table 1, it will be observed that the product of this example practically exhibited the same color saturation value while its $\lambda_D$ was slightly higher.

From a visual comparison of the paint films, it appears that the tinting strength and the hiding power are comparable to those of the commercial products.

EXAMPLES 3–6

In these examples the operative conditions described in Example 1 were followed, but with the following variations:

(a) the compositions of the products, i.e. the value of x, were varied;

(b) precipitation and maturing were conducted at 25° C.; and (c) the final pH of the slurries was adjusted to 3 with a 2 N solution of NaOH.

Compositions and optical characteristics of the products are reported on Table 2.

TABLE 2

| Example | x | % $Bi_2O_3$ (weight) | % $V_2O_5$ (weight) | % $MoO_3$ (weight) | Precipitation temperature (°C.) | $R_v$ | $R_a$ | $R_b$ | $\lambda_D$ | P % |
|---|---|---|---|---|---|---|---|---|---|---|
| 3 | 0.075 | 70.5 | 26.1 | 3.4 | 25 | 66.5 | 78.8 | 7.8 | 576.2 | 82.1 |
| 4 | 0.107 | 69.9 | 25.3 | 4.8 | 25 | 66.4 | 75.4 | 8.4 | 574.4 | 80.7 |
| 5 | 0.213 | 67.9 | 22.5 | 9.6 | 25 | 73.4 | 82.9 | 10.7 | 574.3 | 78.0 |

TABLE 2-continued

| Example | x | % Bi$_2$O$_3$ (weight) | % V$_2$O$_5$ (weight) | % MoO$_3$ (weight) | Precipitation temperature (°C.) | R$_v$ | R$_a$ | R$_b$ | λ$_D$ | P % |
|---|---|---|---|---|---|---|---|---|---|---|
| 6 | 0.317 | 65.9 | 19.7 | 14.4 | 25 | 74.6 | 83.7 | 12.5 | 574.1 | 74.8 |

EXAMPLES 7-12

Keeping the composition of the solid solution of Bi$_{1-(x/3)}$Mo$_x$V$_{1-x}$O$_4$ unchanged at a value of x equal to 0.213, the pH existing at the conclusion of the precipitation was changed by adding, at the end of the precipitation, a 2 N NaOH solution, and also the calcination temperature was varied.

Such tests were conducted in parallel fashion, using a precipitation solution consisting of both acetic and nitric solutions of Bi$^{3+}$.

For the precipitation starting from the acetic solution, the procedures of Example 1 were followed, with the exception that it was operated at 25° C.

For the precipitation starting from the nitric solution, the operation was as follows: 127.27 g of Bi(NO$_3$)$_3$.5H$_2$O were dissolved in 1,300 ml of 1 N HNO$_3$. Separately, 1,100 ml of a solution containing 27.13 g of NaVO$_3$, 14.57 g of Na$_2$MoO$_4$.2H$_2$O and 225 ml of 2 N NaOH were prepared. In 15 minutes the vanadate and molybdate solution was added to the Bi(NO$_3$)$_3$ solution kept under stirring at 25° C. and contained in a 3-liter beaker. At the conclusion of the precipitation the slurry was maintained under stirring for 30 minutes at 25° C.

The values of the pH at the end of the precipitation and of the calcination temperatures are recorded below in Table 3 for the precipitation with the acetic solution and below in Table 4 for the precipitation with the nitric solution.

The procedures not specified are identical with those of Example 1. The results of the colorimetric determinations are also recorded in Tables 3 and 4.

TABLE 3

Precipitation with the acetic solution

| Example | pH at the end of precipitation | Calcination temperature (°C.) | R$_v$ | R$_a$ | R$_b$ | λ$_D$ | P % |
|---|---|---|---|---|---|---|---|
| 7 | 2.25 | 500 | 65.5 | 72.6 | 9.8 | 573.5 | 77.0 |
|  |  | 600 | 64.7 | 71.7 | 10.0 | 573.6 | 77.2 |
| 8 | 5.0 | 500 | 71.8 | 82.4 | 10.6 | 575.0 | 78.0 |
|  |  | 600 | 73.4 | 83.4 | 10.0 | 574.5 | 79.2 |
| 9 | 6.0 | 500 | 53.2 | 70.2 | 7.8 | 576.0 | 79.5 |

TABLE 4

Precipitation with the nitric solution

| Example | pH at the end of precipitation | Calcination temperature (°C.) | R$_v$ | R$_a$ | R$_b$ | λ$_D$ | P % |
|---|---|---|---|---|---|---|---|
| 10 | 0.60 | 500 | 74.1 | 83.5 | 12.5 | 574.4 | 74.7 |
|  |  | 600 | 75.3 | 85.9 | 10.2 | 574.4 | 79.2 |
| 11 | 5.0 | 500 | 71.0 | 81.0 | 13.9 | 575.0 | 71.5 |
|  |  | 600 | 72.9 | 83.2 | 11.4 | 574.8 | 76.7 |
| 12 | 6.0 | 500 | 67.9 | 80.3 | 12.4 | 576.4 | 73.5 |

EXAMPLES 13-16

Table 5 below shows the colorimetric characteristics of products obtained under the same operative conditions as in Example 5, with the exception that the products were calcined at different temperatures in the range of from 400° to 700° C.

In Example 13, the second calcination step lasted 2 hours. Example 15 corresponds to Example 5.

TABLE 5

| Example | x | % Bi$_2$O$_3$ (weight) | % V$_2$O$_5$ (weight) | % MoO$_3$ (weight) | Calcination temperature (°C.) | R$_v$ | R$_a$ | R$_b$ | λ$_D$ | P % |
|---|---|---|---|---|---|---|---|---|---|---|
| 13 | 0.213 | 67.9 | 22.5 | 9.6 | 400 | 69.4 | 77.4 | 11.8 | 574.0 | 74.7 |
| 14 | 0.213 | 67.9 | 22.5 | 9.6 | 500 | 73.2 | 83.2 | 10.7 | 574.5 | 78.0 |
| 15 | 0.213 | 67.9 | 22.5 | 9.6 | 600 | 73.4 | 82.9 | 10.7 | 574.3 | 78.0 |
| 16 | 0.213 | 67.9 | 22.5 | 9.6 | 700 | 67.7 | 76.8 | 10.0 | 574.6 | 77.5 |

EXAMPLE 17

In this example, barium sulphate in such amount as to make up 20% by weight of the final product was co-precipitated with a product of general formula Bi$_{1-(x/3)}$Mo$_x$V$_{1-x}$O$_4$ wherein x=0.213.

In this case the first solution was made up of 70.71 g of Bi(NO$_3$)$_3$.5H$_2$O, 14 g of Ba(NO$_3$)$_2$, 82.0 ml of CH$_3$COOH (99%) and water to make up a volume of 1,000 ml. The pH of such solution was 0.45.

The precipitating solution was made up of 15.07 g of NaVO$_3$, 7.60 g of Na$_2$SO$_4$, 8.10 g of Na$_2$MoO$_4$.2H$_2$O, 125 ml of a 2 N NaOH solution and water to make up a volume of 800 ml. The pH of such solution was 13.1.

Precipitation occurred at 25° C. Precipitation procedures and calcination temperature were analogous to those described in Example 1.

The pH of the slurry at the end of the precipitation was 1.75.

The final product had the following composition by weight:

54.3% of Bi$_2$O$_3$; 18.0% of V$_2$O$_5$; 7.7% of MoO$_3$; 20% of BaSO$_4$.

The product, subjected to x-ray diffraction analysis, revealed two phases: the first phase corresponded to orthorhombic BaSO$_4$, while the second phase corresponded to that described in Example 1.

The colorimetric characteristics and tinting strength of the product, determined in the manner described in Example 1, are reported below in Table 6 together with those of two commercial products: a chromium yellow "primrose" type and a light cadmium yellow.

TABLE 6

| Product | $R_v$ | $R_a$ | $R_b$ | $\lambda_D$ | P % | Tinting strength (%) |
|---|---|---|---|---|---|---|
| Example 17 | 76.4 | 85.9 | 10.8 | 573.7 | 78.7 | 62.0 |
| Chromium yellow "primrose" | 77.2 | 87.6 | 10.2 | 574.0 | 80.0 | 60.1 |
| Light cadmium yellow | 76.7 | 85.7 | 10.7 | 574.0 | 79.0 | 70.6 |

From an examination of the values recorded in Table 6 the optical characteristics of the product of this example are seen to be comparable to those of the two comparison standards.

The tinting strength, though lower than that of the pure product of Example 1, remains however at the level of the chromium yellow standard.

EXAMPLES 18–22

Maintaining the composition of solid solution $Bi_{1-(x/3)}Mo_xV_{1-x}O_4$ at a value of x equal to 0.213 and following the operating procedures described in Example 17, variable amounts of $BaSO_4$ were co-precipitated with said composition.

The resulting compositions, calcination temperatures and values of colorimetric determinations and tinting strength are reported below in Table 7. By way of comparison, the values relating to a commercial pigment based on nickel titanate are also reported.

TABLE 7

| Product | % $Bi_2O_3$ (weight) | % $V_2O_5$ (weight) | % $MoO_3$ (weight) | % $BaSO_4$ (weight) | Calcination temperature (°C.) | $R_v$ | $R_a$ | $R_b$ | $\lambda_D$ | P % | Tinting strength (%) |
|---|---|---|---|---|---|---|---|---|---|---|---|
| Example 18 | 54.3 | 18.0 | 7.7 | 20.0 | 500 | 78.1 | 86.2 | 14.4 | 573.0 | 72.8 | 68.7 |
| Example 19 | 34.0 | 11.3 | 4.7 | 50.0 | 500 | 76.6 | 83.3 | 16.7 | 572.6 | 68.5 | 66.0 |
| Example 20 | 34.0 | 11.3 | 4.7 | 50.0 | 600 | 82.9 | 90.7 | 14.9 | 572.7 | 73.7 | — |
| Example 21 | 13.6 | 4.5 | 1.9 | 80.0 | 500 | 69.1 | 76.5 | 15.7 | 574.0 | 67.2 | 48.8 |
| Example 22 | 13.6 | 4.5 | 1.9 | 80.0 | 600 | 73.6 | 83.2 | 11.1 | 574.8 | 72.0 | — |
| Nickel titanate | | | | | | 74.9 | — | — | 572.5 | 55.2 | 38.4 |

From the values reported in Table 7, it will be observed that the progressive increase of the $BaSO_4$ content in the products involves, as a consequence, a decrease—the calcination temperature remaining unchanged—in the values of color saturation (P%) and tinting strength of the products.

It is to be pointed out, however, that the lowest tinting strength value is also higher than that of the commercial nickel titanate.

EXAMPLES 23–27

In these examples the operating procedures described in Example 2, but with the following variations, were followed:

(a) the compositions of the products of general formula $Bi_{1-(x/3)}W_xV_{1-x}O_4$, i.e. the value of x, were varied; and (b) precipitation was made to occur at 25° C.

The values of the compositions and of the optical characteristics are recorded below in Table 8.

TABLE 8

| Example | x | % $Bi_2O_3$ (weight) | % $V_2O_5$ (weight) | % $WO_3$ (weight) | $R_v$ | $R_a$ | $R_b$ | $\lambda_D$ | P % |
|---|---|---|---|---|---|---|---|---|---|
| 23 | 0.059 | 69.7 | 26.1 | 4.2 | 61.4 | 75.6 | 7.8 | 577.8 | 81.0 |
| 24 | 0.085 | 68.7 | 25.3 | 6.0 | 64.4 | 76.4 | 7.9 | 576.4 | 81.3 |
| 25 | 0.129 | 67.2 | 23.8 | 9.0 | 66.2 | 77.6 | 8.7 | 575.8 | 80.0 |
| 26 | 0.173 | 65.6 | 22.4 | 12.0 | 70.8 | 80.6 | 10.3 | 574.8 | 78.0 |
| 27 | 0.265 | 62.4 | 19.6 | 18.0 | 73.3 | 82.2 | 12.7 | 574.3 | 74.0 |

EXAMPLE 28

In this example barium sulphate, in such amount as to make up 20% by weight of the final product, was coprecipitated with a product of general formula $Bi_{1-(x/3)}W_xV_{1-x}O_4$ wherein x=0.173.

In this case the first solution consisted of 68.26 g of $Bi(NO_3)_3.5H_2O$, 14.00 g of $Ba(NO_3)_2$, 80 ml of $CH_3COOH$ (99%) and water to make up a volume of 1,000 ml; the pH of such solution was 0.25.

The precipitating solution consisted of 15.07 g of $NaVO_3$, 7.60 g of $Na_2SO_4$, 8.51 g of $Na_2WO_4.2H_2O$, 130 cc of a 2 N NaOH solution and water to make up a volume of 800 ml; the pH of such solution was 13.1.

Precipitation was effected at 25° C. The precipitation procedures and calcination temperature were similar to those described in Example 2.

The pH of the slurry at the end of the precipitation was 2.35.

The final product had the following composition by weight:

$Bi_2O_3$=52.4%; $V_2O_5$=18.0%; $WO_3$=9.6%; $BaSO_4$=20.0%.

The product, on x-ray diffraction analysis, revealed three phases: the first phase corresponded to orthorhombic $BaSO_4$; the other two phases corresponded to those already described in Example 2.

The product properties were as follows:

| $R_v$ | $R_a$ | $R_b$ | $\lambda_D$ | P % | Tinting strength (%) |
|---|---|---|---|---|---|
| 71.8 | 82.1 | 10.5 | 575.0 | 78.0 | 65.0 |

EXAMPLES 29–33

Maintaining the composition of solid solution $Bi_{1-(x/3)}W_xV_{1-x}O_4$ at a value of x=0.173 and following the operating procedures described in Example 28, variable amounts of $BaSO_4$ were coprecipitated with said composition.

Compositions, calcination temperatures and values of colorimetric determinations and of tinting strength are reported below in Table 9.

TABLE 9

| Example | % Bi$_2$O$_3$ (weight) | % V$_2$O$_5$ (weight) | % WO$_3$ (weight) | % BaSO$_4$ (weight) | Calcination temperature (°C.) | R$_v$ | R$_a$ | R$_b$ | λ$_D$ | P % | Tinting strength (%) |
|---|---|---|---|---|---|---|---|---|---|---|---|
| 29 | 52.4 | 18.0 | 9.6 | 20.0 | 500 | 73.2 | 82.2 | ;16.6 | 574.5 | 70.0 | 71.9 |
| 30 | 32.7 | 11.3 | 6.0 | 50.0 | 500 | 77.0 | 85.1 | 16.4 | 573.9 | 69.0 | 66.7 |
| 31 |  |  |  |  | 600 | 76.8 | 86.2 | 11.8 | 574.1 | 77.0 | — |
| 32 | 13.1 | 4.5 | 2.4 | 80.0 | 500 | 75.0 | 81.8 | 16.5 | 573.2 | 68.0 | 49.3 |
| 33 |  |  |  |  | 600 | 72.9 | 82.8 | 12.7 | 574.8 | 74.3 | — |

What is claimed is:

1. An inorganic yellow pigment characterized in that it consists essentially of Bi$_{1-(x/3)}$M$_x$V$_{1-x}$O$_4$ in which M is Mo or W and in which x varies from 0.075 to 0.317 in the case of Mo and from 0.059 to 0.265 in the case of W, and in that it consists essentially of only a tetragonal crystalline scheelite-type phase when M is Mo while, when M is W, also orthorhombic crystalline phase γ Bi$_2$WO$_6$ is present besides the said tetragonal crystalline phase.

2. An inorganic yellow pigment as defined in claim 1, characterized in that x ranges from about 0.075 to about 0.230 in the case of Mo and from about 0.059 to about 0.180 in the case of W.

3. An inorganic yellow pigment as defined in claim 1 or 2, characterized in that it contains furthermore a crystalline phase consisting essentially of orthorhombic BaSO$_4$ obtained by co-precipitation and simultaneous calcination with the substances used for preparing Bi$_{1-(x/3)}$M$_x$V$_{1-x}$O$_4$ and in which the amount in weight percent of BaSO$_4$ is higher than 0% and lower than or equal or 80%.

4. An inorganic yellow pigment as defined in claim 3, characterized in that it contains from 30 to 60% by weight of BaSO$_4$.

5. A process for preparing an inorganic yellow pigment as defined in claim 1 or 2, characterized in that a solution of Bi(NO$_3$)$_3$ in nitric or acetic acid is prepared, the nitric solution pH being not greater than 0.5 while the acetic solution pH ranges from 0.1 to 1.5; an alkaline solution of alkaline vanadate or of ammonium vanadate and of alkaline molybdate or tungstate or of ammonium molybdate or tungstate is prepared, the pH of the alkaline solution ranging from 8 to 14; the latter solution is added under stirring to the former, thus causing the precipitation of a product resulting from the reaction between the cations Bi$^{+++}$ and the anions, the pH at the conclusion of the precipitation being in the range of from 0.5 to 6.0; the precipitate is separated from the mother liquor and washed to remove the soluble salts; it is calcined in the presence of air at temperatures in the range of from 400° to 700° C.; the calcination product is gradually cooled down and then ground.

6. A process as defined in claim 5 for preparing a pigment containing also BaSO$_4$ according to claim 3 or 4, characterized in that the first solution contains also Ba(NO$_3$)$_2$ and the second solution contains furthermore an alkaline sulphate or ammonium sulphate.

7. A process as defined in claim 5 or 6 characterized in that the precipitation step occurs at a temperature ranging from 25° to 60° C.

8. A process as defined in one of claim 5, 6 or 7, characterized in that the pH at the conclusion of the precipitation ranges from 1.5 to 4.0.

9. A process as defined in claim 5, 6, 7 or 8, characterized in that calcination occurs at a temperature ranging from 500° to 600° C.

* * * * *